United States Patent
Moran

(10) Patent No.: US 6,690,875 B2
(45) Date of Patent: Feb. 10, 2004

(54) OPTICAL FIBER ARRAY AND METHOD OF ALIGNING OPTICAL FIBERS IN THE ARRAY

(75) Inventor: Joseph M. Moran, Berkeley Heights, NJ (US)

(73) Assignee: Veritech, Inc., Whippany, NJ (US)

( * ) Notice: Subject to any disclaimer, the term of this patent is extended or adjusted under 35 U.S.C. 154(b) by 0 days.

(21) Appl. No.: 10/039,453

(22) Filed: Dec. 31, 2001

(65) Prior Publication Data

US 2003/0123835 A1 Jul. 3, 2003

Related U.S. Application Data

(63) Continuation-in-part of application No. 09/739,045, filed on Dec. 18, 2000, now Pat. No. 6,522,817.

(51) Int. Cl.[7] ................................................. G02B 6/04
(52) U.S. Cl. ........................... 385/137; 385/120; 29/850
(58) Field of Search ................................ 385/137, 120; 29/850

(56) References Cited

U.S. PATENT DOCUMENTS

| | | | |
|---|---|---|---|
| 5,394,498 A | * | 2/1995 | Hinterlong et al. ......... 385/115 |
| 5,907,650 A | | 5/1999 | Sherman et al. .............. 385/80 |
| 2001/0051028 A1 | * | 12/2001 | Gutierrez et al. ............. 385/85 |
| 2002/0181884 A1 | * | 12/2002 | Fujioka et al. ................ 385/53 |
| 2003/0007758 A1 | * | 1/2003 | Rose et al. .................. 385/115 |
| 2003/0016935 A1 | * | 1/2003 | Nakajima ................... 385/137 |

* cited by examiner

Primary Examiner—Michael C. Zarroli
(74) Attorney, Agent, or Firm—Irwin Ostroff; Erwin W. Pfeifle

(57) ABSTRACT

Alignment of an array of N elements, such as optical fibers, within a preselected tolerance value is obtained using a primary substrate with a plurality of N apertures extending therethrough from a first surface to a second opposing surface. Each aperture, at its narrowest point, has a cross-section that is greater than a cross-section of an element to be inserted therethrough. Each of the elements passes through its corresponding aperture and rests against the same corresponding point and/or sidewall of the aperture so as to result in the desired alignment. A directing arrangement directs the elements toward the primary substrate at a predetermined angle to cause a spring-like action to occur in each of the elements when threaded through its associated aperture for aligning the elements to engage the same corresponding point and/or sidewall of the aperture.

43 Claims, 8 Drawing Sheets

OPTICAL FIBER ARRAY AND METHOD OF ALIGNING OPTICAL FIBERS IN THE ARRAY

CROSS-REFERENCE TO RELATED APPLICATIONS

This application is a Continuation-In-Part of application Ser. No. 09/739,045, filed Dec. 18, 2000, now U.S. Pat. No. 6,522,817, issued on Feb. 18, 2003 and having a common inventor and assignee and being an application that was copending with the present application.

FIELD OF THE INVENTION

The present invention relates to method and apparatus for providing an alignment of elements such as optical fibers in a predetermined array to a predetermined tolerance value.

BACKGROUND OF THE INVENTION

Fiberoptics is used in the communication industry for high levels of data transport. As a result, optical fibers need to be coupled with precision to semiconductors, detectors, and mirrors in arrays.

A method for obtaining precision accuracies is to use photolithography to image a mask of array openings on a substrate such as silicon. Silicon is chosen because it has a low thermal coefficient equal to that of silicon substrates that optical fibers match into. Using a photolithographic mask, the openings of the array are etched in the silicon wafers. For small openings such as those for 125 micrometer diameter single mode optical fibers which are nominally 124–126 micrometers in diameter, the cross-section of the etched opening in the silicon substrate is nominally 126 micrometers. There can be a variation in the size of the opening during etching or laser drilling. As a result, the openings can have variations in cross-section and, consequently, cause inaccuracies in the placement of optical fibers in the plane of the substrate.

It is desirable to provide an array of elements, such as optical fibers, in which alignment (i.e., center-to-center spacings of the elements) of an exemplary tolerance value of ±2.0 micrometers is repeatedly achievable and to have registration techniques to achieve such alignment accuracy for the elements.

SUMMARY OF THE INVENTION

The present invention is directed to method and apparatus for providing an alignment of an array of elements such as optical fibers to a preselected center-to-center tolerance value.

From a first apparatus aspect, the present invention is directed to an array apparatus comprising a primary substrate and a plurality of N elements. The primary substrate has sufficient structure to support an array of N spaced-apart elements and defines a plurality of N apertures which each extend therethrough from a first surface to a second opposing surface of the primary substrate with a cross-section of each of the N apertures being greater than a cross-section of an optical fiber and having a center that is aligned to a preselected tolerance value which is required for the array of elements. A smallest cross-section of each of the apertures is such that when the plurality of elements are inserted through their primary substrate apertures they have limited variations that facilitate spacings between adjacent elements that are within the preselected tolerance value. Each of the elements passes through one of the N apertures in the primary substrate and rests against the same one of a group consisting of a predetermined point and a predetermined side of its associated aperture such that the plurality of N elements are aligned within the preselected tolerance value.

From a second apparatus aspect, the present invention is directed to an optical fiber array apparatus comprising a primary substrate and a plurality of N optical fibers. The primary substrate has sufficient structure to support an array of N spaced-apart optical fibers and defines a plurality of N apertures which each extend therethrough from a first surface to a second opposing surface of the primary substrate with a cross-section of each of the N apertures being greater than a cross-section of an optical fiber and having a center that is aligned to a preselected tolerance value which is required for the array of optical fibers. A smallest cross-section of each of the apertures is such that when the plurality of optical fibers are inserted through their primary substrate apertures they have limited variations that facilitate spacings between adjacent optical fibers that are within the preselected tolerance value. Each optical fiber comprises a cladding layer surrounding an optical core, and when each optical fiber is inserted through its associated aperture in the primary substrate it is registered by a spring-like force in the optical fiber against one of a group consisting of a predetermined point and a predetermined side of its associated aperture which is the same for each of the plurality of N optical fibers and their associated apertures such that the plurality of N optical fibers are aligned within the preselected tolerance value.

From a third apparatus aspect, the present invention is directed to apparatus for registering a plurality of optical fibers in an optical fiber array comprising a primary substrate and a directing arrangement. The primary substrate has sufficient structure to support an array of N spaced-apart optical fibers and defines a plurality of N apertures in a predetermined pattern which each extend therethrough from a first surface to a second opposing surface of the primary substrate where each of the N apertures comprises a cross-section which is greater than a cross-section of an optical fiber, the apertures having centers that are aligned to a preselected tolerance value which is required for the array of optical fibers. A smallest cross-section of each of the apertures is such that optical fibers inserted through the primary substrate apertures have limited variations that facilitate spacings between adjacent optical fibers placed in the apertures being within the preselected tolerance value. The directing arrangement directs each of the plurality of N optical fibers at a predetermined angle towards the primary substrate so that each optical fiber is curved with a spring-like action after threading into the associated aperture in the primary substrate such that the optical fiber is registered against one of a group consisting of at least one of a predetermined point and a predetermined side of the associated aperture in the primary substrate.

From a fourth apparatus aspect, the present invention is directed to an array apparatus comprising a primary substrate and a plurality of N elements. The primary substrate has sufficient structure to support an array of N spaced-apart elements and defines a plurality of N apertures which each extend therethrough from a first surface to a second opposing surface of the primary substrate with a cross-section of each of the N apertures being greater than a cross-section of an element and having a center that is aligned to a preselected tolerance value which is required for the array of elements. A smallest cross-section of each of the apertures is such that when the plurality of elements are inserted through their primary substrate apertures they have limited variations that facilitate spacings between adjacent elements that are within the preselected tolerance value. When each element is inserted through its associated aperture in the primary substrate it is registered, by a spring-like force in the element, against one of a group consisting of a predetermined point and a predetermined side of its associated aperture which is the same for each of the plurality of N elements and their associated apertures such that the plurality of N elements are aligned within the preselected tolerance value.

From a fifth apparatus aspect, the present invention is directed to array apparatus comprising a relatively thick primary substrate and a relatively thin first layer. The relatively thick primary substrate has sufficient structure to support an array of N spaced-apart elements and has first and second opposing surfaces and defines a plurality of N primary substrate apertures which each extend therethrough from the first surface to the second surface with a cross-section of each of the N substrate apertures being greater than a cross-section of an element such that one element can be passed through in each of the N primary substrate apertures. The relatively thin first layer, which has insufficient structure by itself to support an array of N spaced-apart elements, engages the second surface of the primary substrate and defines N apertures therethrough with centers thereof being aligned to a preselected tolerance value which is that required for the array of elements. The smallest cross-section of each of the first layer apertures is less than the smallest cross-section of each of the primary substrate apertures and greater than the cross-section of an element to be placed therein, each first layer aperture being within a footprint of one of the primary substrate apertures. When each element is inserted through its associated aperture in each of the primary substrate and the relatively thin first layer it is registered against one of a group consisting of a predetermined point and a predetermined side of its associated aperture which is the same for each of the plurality of N elements and their associated apertures such that the plurality of N elements are aligned within the preselected tolerance value.

From a first method aspect, the present invention is directed to a method of registering a plurality of N elements to a preselected value in an array. The comprises the steps of: forming a primary substrate having sufficient structure to support an array of N spaced-apart elements and defining a plurality of N apertures in a predetermined pattern across the primary substrate, wherein each aperture extends therethrough from a first surface to a second opposing surface of the primary substrate, has a cross-section at its narrowest point which is greater than a cross-section of an element, and has a center which is aligned to a preselected tolerance value for the apertures which is required for the array of elements, the smallest cross-section of each of the apertures being such that elements inserted through the primary substrate apertures have predetermined limited side movement variations; and inserting each of the plurality of N elements through one of the N apertures in the primary substrate such that each of the N elements rests against at least one of a group consisting of a predetermined point and a predetermined side of its associated aperture such that the plurality of N elements are aligned within the preselected tolerance value.

From a second method aspect, the invention is directed to a method of registering a plurality of N optical fibers to a preselected value in an optical fiber array. The method comprises the steps of: (a) forming a primary substrate having sufficient structure to support an array of N spaced-apart optical fibers and defining a plurality of N apertures in a predetermined pattern across the primary substrate, wherein each aperture extends therethrough from a first surface to a second opposing surface of the primary substrate, has a cross-section at its narrowest point which is greater than a cross-section of a cladding layer of an optical fiber, and has a center which is aligned to a preselected tolerance value for the apertures which is required for the array of optical fibers, the smallest cross-section of each of the apertures being such that optical fibers inserted through the primary substrate apertures have predetermined limited side movement variations; (b) directing each of the plurality of N optical fiber at a predetermined angle towards the primary substrate from a directing arrangement; and (c) causing each optical fiber to be curved with a spring-like action into a predetermined angular direction to the first surface of the primary substrate for threading through the associated aperture in the primary substrate, and be registered against one of a group consisting of a predetermined point and a predetermined side of its associated aperture by the spring-like action when the optical fiber is threaded through the associated aperture in the primary substrate.

From a third method aspect the invention is directed to a method of forming an array apparatus which supports N spaced-apart elements to a preselected tolerance value. The method comprises the steps of: (a) forming a primary substrate having sufficient structure to support an array of N spaced-apart elements and defining a plurality of N apertures in a predetermined pattern across the primary substrate, wherein each aperture extends therethrough from a first surface to a second opposing surface of the primary substrate, has a cross-section at its narrowest point which is greater than a cross-section of an element, and has a center which is aligned to a preselected tolerance value for the apertures which is required for the array of elements, the smallest cross-section of each of the apertures being such that elements inserted through the primary substrate apertures have predetermined limited side movement variations; (b) directing each of the plurality of N elements at a predetermined towards the primary substrate from a directing arrangement; and (c) causing each element to be curved with a spring-like action into a predetermined angular direction to the first surface of the primary substrate for threading through the associated aperture in the primary substrate, and be registered against one of a group consisting of a predetermined point and a predetermined side of its associated aperture by the spring-like action when the element is threaded through the associated aperture in the primary substrate.

The invention will be better understood from the following more detailed description taken with the accompanying drawings and claims.

The drawings are not necessarily to scale.

DETAILED DESCRIPTION OF THE INVENTION

It is to be understood that corresponding elements having the same function in the several views of the drawings are provided with the same designation numbers. It is to be understood that the description of the present invention hereinafter is directed to forming arrays with single mode or multimode optical fibers, but that the principles of the present invention can also be applied to other elements such as flexible wires.

Figure 1:
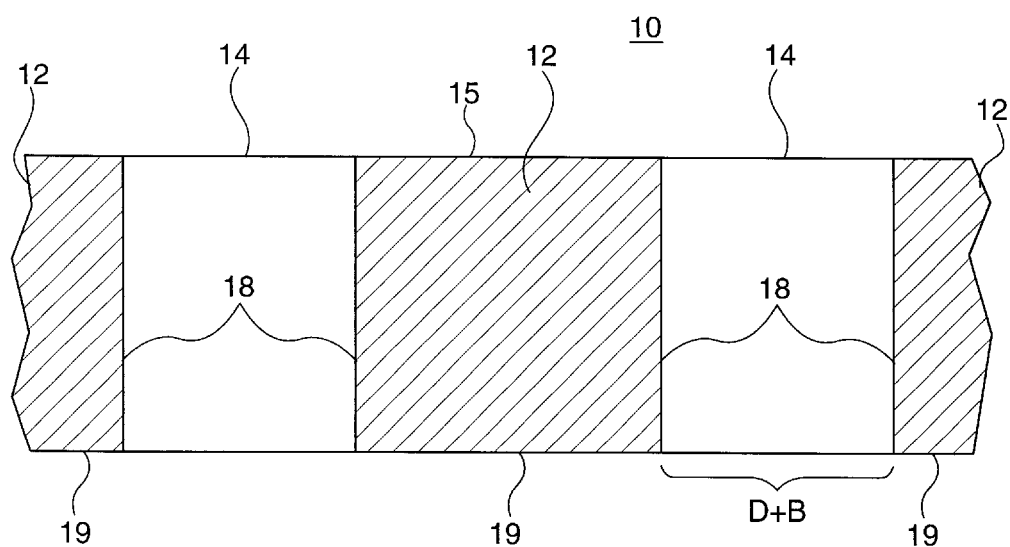
FIG. 1 is a cross-sectional side view of a section of a substrate array for mounting elements such as optical fibers in accordance with a first embodiment of the present invention.

Referring now to FIG. 1, there is shown a cross-sectional side view of a section of a substrate array 10 for supporting and aligning (registering) an array of elements (e.g., optical fibers) with center-to-center spacings of a preselected value in accordance with a first embodiment of the present invention. The substrate array 10 comprises a primary substrate 12. Primary substrate 12 can comprise, for example, Macor™ (a trademark of Corning), ceramic, silicon, metal, plastic, or other suitable material. The primary substrate 12 has a top surface 15, an opposing surface 19, and defines a plurality of N apertures 14 (of which only two apertures 14 are shown) comprising sidewalls 18 formed therethrough in a predetermined spaced-apart pattern. Each aperture 14 has a cross-section D+B which is greater than an outside cross-section D of a cladding layer 34 of an optical fiber 30 (shown in FIG. 2) to be inserted therethrough when the substrate array 10 is used to form and affix an array of optical fibers. The sizes of the cross-sections of the apertures 14 in the primary substrate 12 have possible variations that could facilitate center-to-center spacings (alignment, registration) between the optical fibers randomly placed in the apertures 14 that are outside a preselected tolerance value. For purposes of discussion hereinafter, it is assumed that each optical fiber 30 has an exemplary cladding layer cross-section D of 125 microns and the aperture 14 in the substrate array 10 to which an optical fiber 30 is to inserted has an exemplary cross-section D+B, when cylindrical, of substantially 126–127 microns.

For purposes of a description of FIGS. 3–11 hereinbelow, it is assumed that the optical fibers 30 passing through the apertures 14 of the primary substrate 12 have cylindrical ends, a portion of a jacket 32 (see FIG. 2) has been removed, and a cladding layer 34 and a core 36 thereof pass completely through an associated aperture 14. The size of each aperture 14 is designed to have a cross-section that is greater than the cross-section of a cladding layer 34 and the optical core 36 of the optical fiber 30, and is selected such that no matter where the cladding layer 34 of an optical fiber 30 is located within an associated aperture 14, the optical fiber 30 is aligned to other optical fibers 30 in their respective apertures 14 to a preselected tolerance value. This means that the center-to-center spacing between adjacent optical fibers 30 is within the preselected tolerance value.

Figure 2:
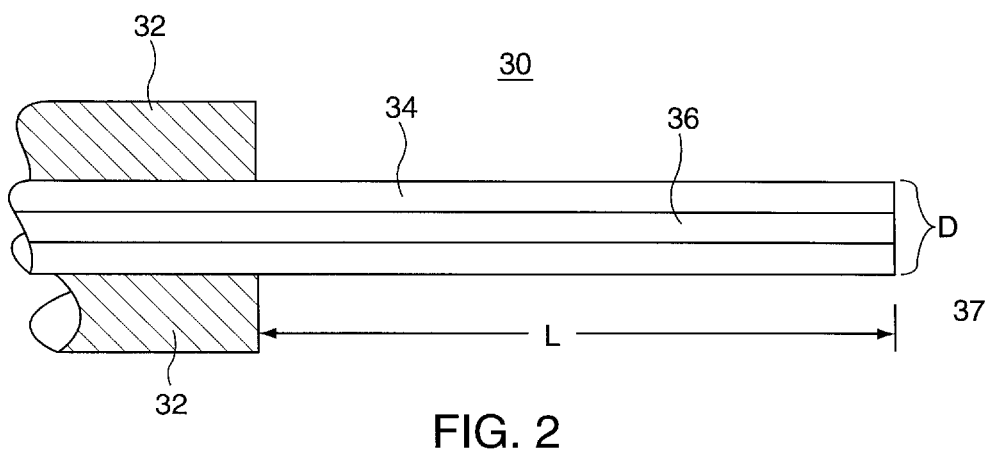
FIG. 2 is a cross-sectional side view through the center of an optical fiber which is to be inserted through an aperture of the substrate array shown in FIG. 1 in accordance with the present invention.

Referring now to FIG. 2, there is shown a cross-sectional side view through the center of an optical fiber 30 which is formed to mount in (pass through) an associated aperture 14 of the substrate array 10 shown in FIG. 1 in accordance with the present invention. The optical fiber 30 comprises a jacket 32 which surrounds a cladding layer 34 which surrounds an optical core 36. In preparation for insertion into an aperture 14 of the substrate array 10, the optical fiber 30 has its jacket 32 removed for a distance "L" from one end thereof.

Figure 3:
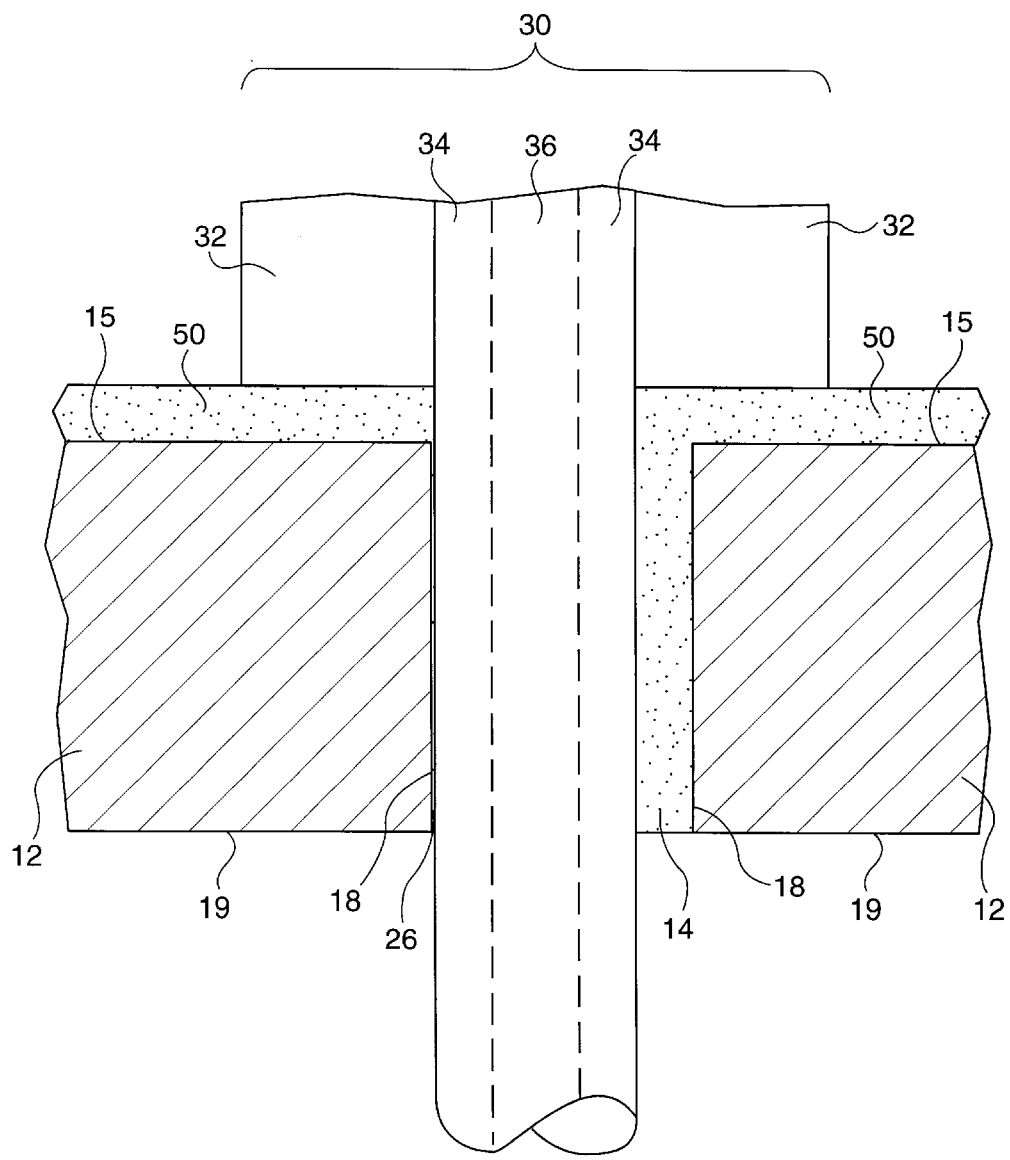
FIG. 3 is a cross-sectional side view of part of the optical fiber of FIG. 2 which has been inserted through an aperture of the substrate array of FIG. 1 in accordance with the basic concept of the present invention.

Referring now to FIG. 3, there is shown a cross-sectional side view of a section of the substrate array 10 of FIG. 1 which comprises an optical fiber 30 of FIG. 2 after it is inserted through an aperture 14 in the primary substrate 12 and is registered in contact with one side (or point) 26 of the aperture 14 in accordance with the present invention. The optical fiber 30 is shown with a terminated end of its jacket 32 located near the top surface 15 of the primary substrate 12 with the exposed cladding layer 34 extending through the associated aperture 14 in the primary substrate 12. The length "L" of the exposed cladding layer 34 is sufficient to extend through the aperture 14 and beyond the exposed lower surface 19 of the primary substrate 12. The cladding layer 34 is typically further caused to be positioned in the aperture 14 of the primary substrate 12 to engage at least one predetermined point or line 26 (only one side) on the wall 18 of the slightly larger aperture 14 in the primary substrate 12 as is explained hereinbelow with respect to FIG. 4. Once the optical fiber 30 has been inserted and registered against one point or side of the aperture 14, a layer of bonding material 50 can be spread over the surface 15 of the primary substrate 12 and into the apertures 14 to fixedly position the optical fibers 30 in their associated apertures 14.

Figure 4:
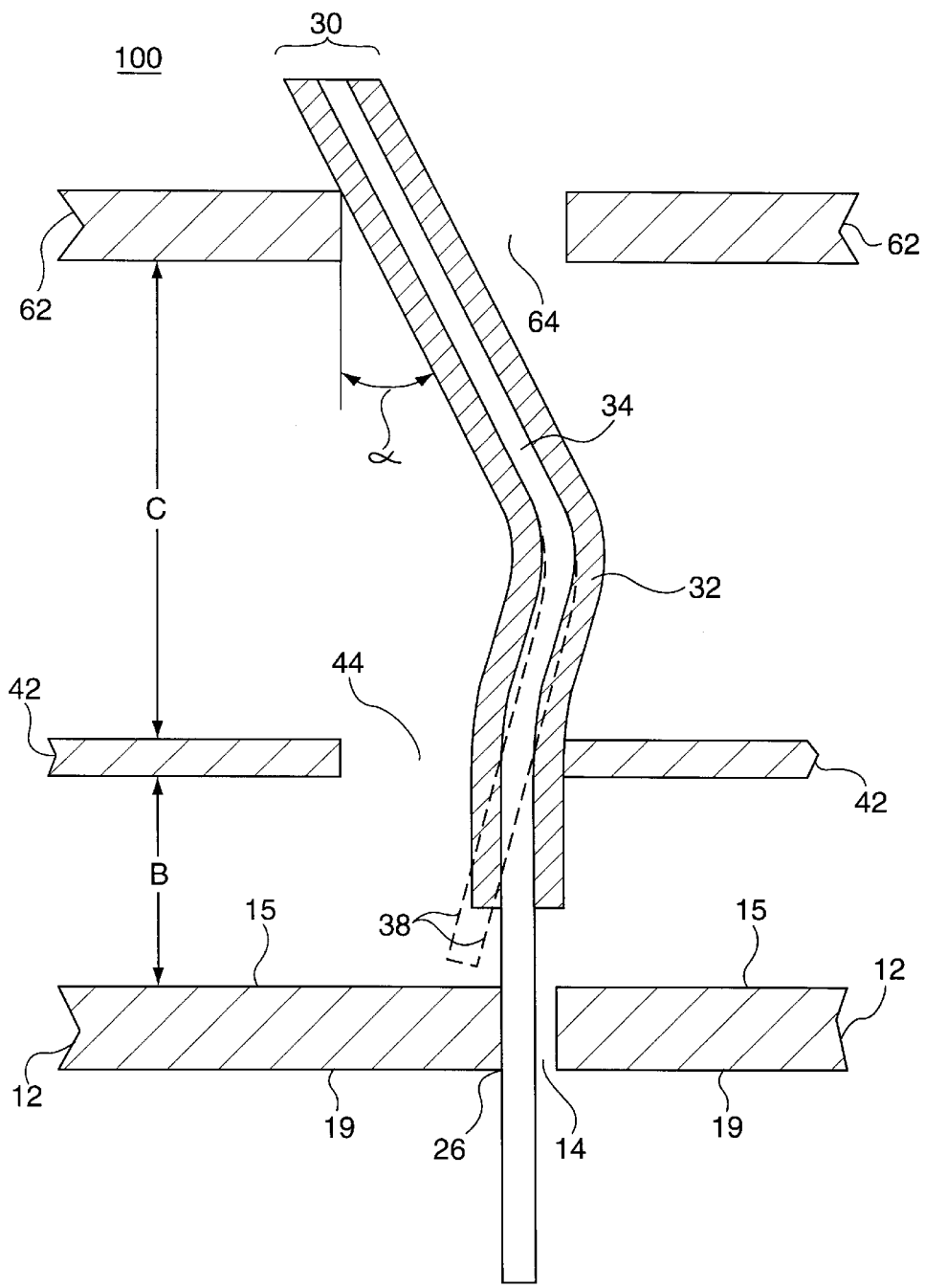
FIG. 4 shows a cross-sectional side view of a portion of an arrangement for mounting and registering each optical fiber shown in FIG. 2 in its associated aperture in the substrate array of FIG. 1 in accordance with the present invention.

Referring now to FIG. 4, there is shown a cross-sectional side view of a small portion of an arrangement 100 for mounting and registering an optical fiber 30 shown in FIG. 2 in its associated aperture 14 in the substrate array 10 of FIG. 1 in accordance with the present invention. The arrangement 100 comprises the substrate array 10 of FIG. 1, an angular alignment substrate 42, and a housing entry substrate 62, the substrates 12, 42, and 62 being spaced-apart from each other by predetermined distances as explained hereinbelow. The substrate array 10 (as shown in FIG. 1)

defines a plurality of N spaced-apart apertures 14 (only one of which is shown) for mounting a separate optical fiber 30 therein. Each aperture 14 is formed with a size that is slightly larger than a cladding layer 34 of the optical fiber 30 to be mounted therein as was explained hereinabove with reference to FIG. 3.

Figure 5:
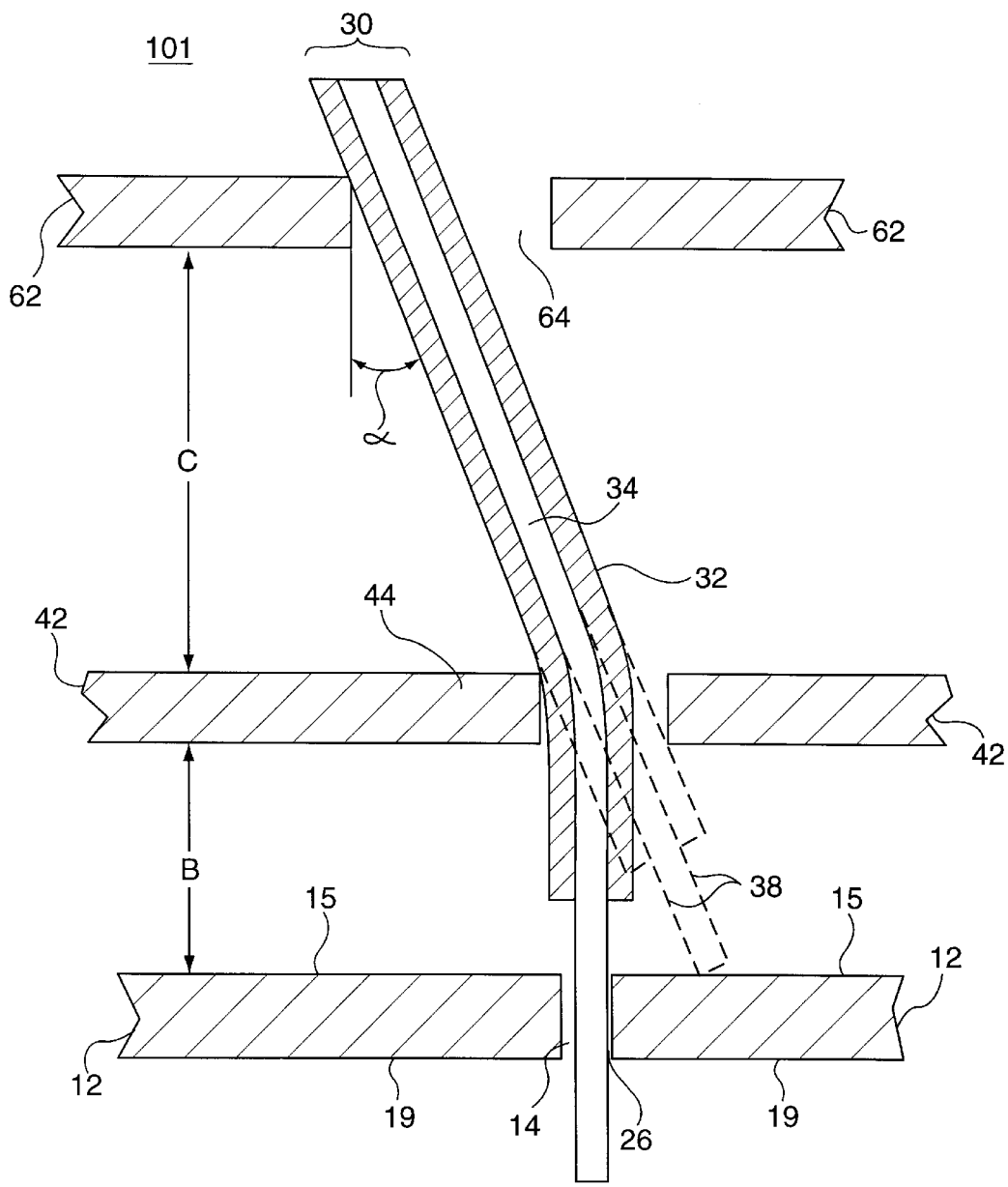
FIG. 5 shows a cross-sectional side view of a portion of an arrangement for mounting and registering each optical fiber shown in FIG. 2 in its associated aperture in the substrate array of FIG. 1 in accordance with the present invention.

The angular alignment substrate 42 defines a plurality of N apertures 44 (of which only one is shown) which have a pattern that corresponds to the apertures 14 in the primary substrate 12. The apertures 44 have a cross-section which is larger than a jacket 32 surrounding the optical fiber 30. The angular alignment substrate 42 is separated from the primary substrate 12 by a predetermined distance B, and has its apertures 44 slightly offset from alignment with the axes of the apertures 14 in the primary substrate 12 by a predetermined amount. The housing entry substrate 62 defines a plurality of N apertures 64 (only one of which is shown) which have a spaced-apart pattern that corresponds to the apertures 14 in the primary substrate 12. The apertures 64 have a cross-section which is larger than the jacket surrounding the optical fiber 30. The housing entry substrate 62 is separated from the angular alignment substrate 42 by a predetermined distance C. In FIG. 4, the axes of the apertures 64 are aligned with the axes of the apertures 44 in the angular alignment substrate 42. In FIG. 5, the axes of the apertures 64 not aligned with the axes of the apertures 44 in the angular alignment substrate 42. Exemplary distances which can be used for distances B and C in FIG. 4, and in FIG. 5, are one-half inch and 2–3 inches, respectively.

In assembling the plurality of N optical fibers 30 (only a portion of one optical fiber 30 is shown) into their respective plurality of N apertures 14 in the primary substrate 12, each optical fiber 30 is individually threaded through one of the apertures 64 in the housing entry substrate 62, and then through one of the apertures 44 in the angular alignment substrate 42. In accordance with the present invention, the optical fiber 30 is directed at a predetermined angle α from vertical through the aperture 64 in the housing entry substrate 62 in order to reach its associated aperture 44 in the angular alignment substrate 42. When the optical fiber 30 is directed into the aperture 44 in the angular alignment substrate 42, the exposed outer surface thereof (first the cladding layer 34 and then the jacket 32) contacts one side of the aperture 44 and is caused to bend in a spring-like manner away from the aperture 44 as is indicated by the dashed line segment 38. The spring-like action of the optical fiber 30 requires that the optical fiber 30 be individually moved over so it can be threaded through the associated aperture 44 in the angular alignment substrate 42 and through associated aperture 14 in the primary substrate 12. The spring-like force that was created in the optical fiber 30 by the threading method through the housing entry substrate 62 and the angular alignment substrate 42 causes the optical fiber to be registered to one side 26 of the aperture 14 in the primary substrate 12 when mounted therein. The above method is used to register the remaining N−1 optical fibers 30 in a same orientation in their respective apertures 64, 44, and 14 in the housing entry substrate 62, angular alignment substrate 42 and primary substrate 12, respectively, to cause all of the plurality of N optical fibers 30 to be registered to a corresponding common point 26 in each of the apertures 14. Once all of the plurality of N optical fibers 30 are registered in their respective apertures 14 in the primary substrate 12, the optical fibers 30 can be bonded to the primary substrate 12 and their respective apertures 14 using a layer of bonding material 50 (as shown in FIG. 3). When all optical fibers 30 are registered and bonded in place in the apertures 14 of the primary substrate 12, the exposed ends of the optical fibers 30 are then ground and polished to align with the bottom surface 19 of the primary substrate 12. The spring-like force that will be developed in each optical fiber 30 is dependent upon the insertion angle α, the offsets used between the associated apertures 14 and 44 in the primary substrate 12 and angular alignment substrate 42, and the distances B and C between the substrates 12, 42, and 62. It is to be understood that the combination of the substrates 42 and 62 can be designated as a directing arrangement since any suitable arrangement can be used that functions as is described hereinafter for the substrates 42 and 62.

Referring now to FIG. 5, there is shown a cross-sectional side view of a small portion of an arrangement 101 for mounting and registering an optical fiber 30 shown in FIG. 2 in its associated aperture 14 in the substrate array 10 of FIG. 1 in accordance with another embodiment of the present invention. The arrangement 101 is similar to the arrangement 100 of FIG. 4 and comprises the substrate array 10 of FIG. 1, an angular alignment substrate 42, and a housing entry substrate 62, the substrates 12, 42, and 62 being spaced-apart from each other by predetermined distances as explained hereinbelow. The substrate array 10 (as shown in FIG. 1) defines a plurality of N spaced-apart apertures 14 (only one of which is shown) for mounting a separate optical fiber 30 therein. Each aperture 14 is formed with a size that is slightly larger than a cladding layer 34 of the optical fiber 30 to be mounted therein as was explained hereinabove with reference to FIG. 3.

The angular alignment substrate 42 defines a plurality of N apertures 44 (of which only one is shown) which have a pattern that corresponds to the apertures 14 in the primary substrate 12. The apertures 44 have a cross-section which is larger than a jacket 32 surrounding the optical fiber 30. The angular alignment substrate 42 is separated from the primary substrate 12 by a predetermined distance B, and has its apertures 44 slightly offset from alignment with the axes of the apertures 14 in the primary substrate 12 by a predetermined amount. The housing entry substrate 62 defines a plurality of N apertures 64 (only one of which is shown) which have a spaced-apart pattern that corresponds to the apertures 14 in the primary substrate 12. The apertures 64 have a cross-section which is larger than the jacket surrounding the optical fiber 30. The housing entry substrate 62 is separated from the angular alignment substrate 42 by a predetermined distance C with the axes of the apertures 64 laterally offset from the axes of the apertures 44 in the angular alignment substrate 42 by a predetermined distance. Exemplary distances which can be used for distances B and C are one-half inch and 2–3 inches, respectively.

In assembling the plurality of N optical fibers 30 (only a portion of one optical fiber 30 is shown) into their respective plurality of N apertures 14 in the primary substrate 12, each optical fiber 30 is individually threaded through one of the apertures 64 in the housing entry substrate 62, and then through a corresponding aperture 44 in the angular alignment substrate 42. In accordance with this embodiment of the present invention, the optical fiber 30 is directed at a predetermined angle α from vertical through the aperture 64 in the housing entry substrate 62 in order to reach its associated aperture 44 in the angular alignment substrate 42. When the optical fiber 30 is directed into the aperture 44 in the angular alignment substrate 42, the exposed outer surface thereof (first the cladding layer 34 and then the jacket 32) contacts one side of the aperture 44 and goes straight through the aperture 44 as is shown by dashed lines 38. The optical fiber 30 is then moved so that it is bent back in a spring-like manner and threaded into the associated aperture 14 in the primary substrate 12. The spring-like force that was created in the optical fiber 30 by the threading method through the housing entry substrate 62, the angular alignment substrate 42 and the primary substrate aperture 14 causes the optical fiber to be registered to one side 26 of the aperture 14 in the primary substrate 12 when mounted therein. The above method is also used to register the remaining N−1 optical fibers 30 in a same orientation in their respective apertures 64, 44, and 14 in the housing entry substrate 62, angular alignment substrate 42 and primary substrate 12, respectively, to cause all of the plurality of N optical fibers 30 to be registered to a corresponding common point 26 in each of the apertures 14. Once all of the plurality of N optical fibers 30 are registered in their respective apertures 14 in the primary substrate 12, the optical fibers 30 can be bonded to the primary substrate 12 and their respective apertures 14 using a layer of bonding material 50 (as shown in FIG. 3). When all optical fibers 30 are registered and bonded in place in the apertures 14 of the primary substrate 12, the exposed ends of the optical fibers 30 are then ground and polished to align with the bottom surface 19 of the primary substrate 12. The spring-like force that will be developed in each optical fiber 30 is dependent upon the insertion angle α, and the distances B and C between the substrates 12, 42, and 62. It is to be understood that the combination of the substrates 42 and 62 can be designated as a directing arrangement since any suitable arrangement can be used that functions as is described hereinafter for the substrates 42 and 62.

Angular alignment error is a measure of the angle and magnitude of variability of the angle that the optical fiber 30 makes with respect to the primary substrate surface 15. Referring to FIGS. 4 and 5, the angle and the variability in the angle of the optical fiber 30 are dependent on the final location of the optical fiber 30 in the primary substrate aperture 14 and the final location of the optical fiber 30 in the alignment substrate 44. Since each of the apertures 14 in the primary substrate 12 are somewhat larger than the claddings 34 of the optical fibers 30, and since each of the apertures 44 in the angular alignment substrate 42 and the apertures 64 in the housing substrate 62 are somewhat larger than the jackets 32 of the optical fibers 30, the optical fibers 30 may bend and touch anywhere on a side of apertures 14, 44 and 64 if no directing arrangement, as shown in FIGS. 4 and 5, is used to thread the optical fibers 30 through the associated apertures. The angle and the magnitude of variability of the angle that each of the optical fibers 30 makes with the primary substrate surface 15 can be easily computed using the locations of the centers and the widths of the openings of the primary substrate aperture 14 and the angular alignment substrate aperture 44, the width of the optical fiber jacket 32 in the angular alignment aperture 44, the width of the optical fiber cladding 34 in the primary substrate 14, and the distance B between the primary substrate 12 and the alignment substrate 42. Referring to FIGS. 4 and 5, the use of a directing arrangement causes the optical fibers 30 to be registered to the same edge of the angular substrate aperture 44 and the same edge of the primary substrate aperture 13 for all of the plurality of N optical fibers 30. This results in a reduction in the angular alignment error of the optical fibers 30.

Figure 6:
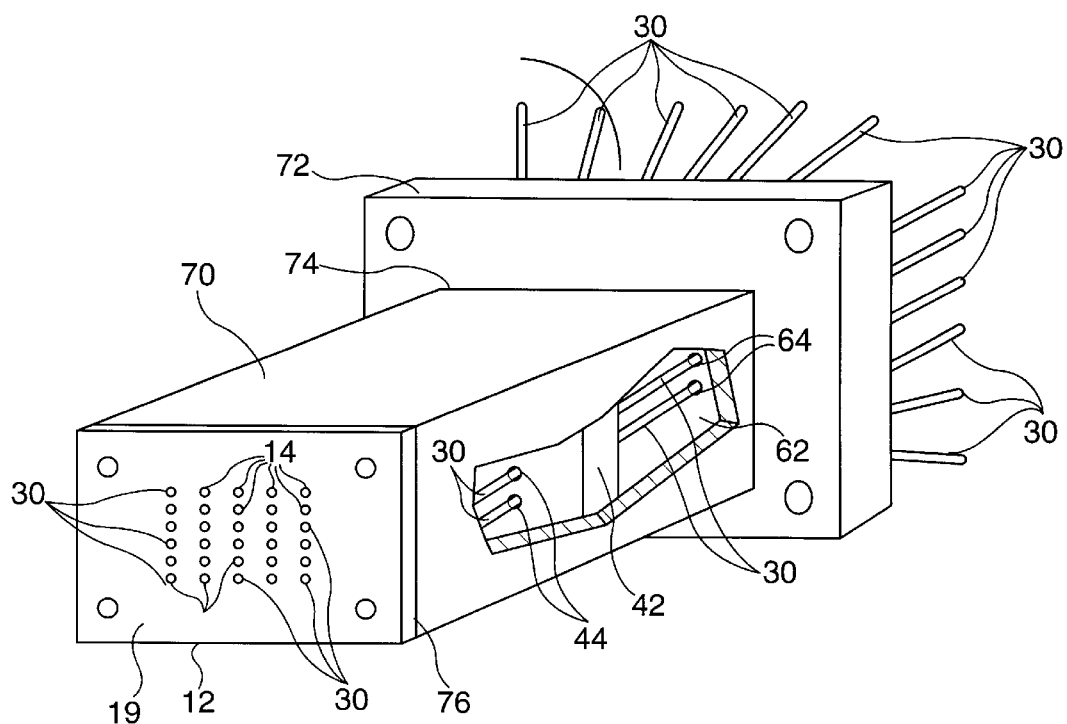
FIG. 6 shows a perspective view of a completed housing for the substrate array of FIG. 1 once the optical fibers have been completely assembled as shown in FIG. 4 in accordance with the present invention.

Referring now to FIG. 6, there is shown a perspective view of a partially broken away completed housing 70 for a substrate array 10 once a plurality of N optical fibers 30 have been completely assembled as shown in either FIG. 4 or 5 in accordance with the present invention. The housing 70 includes a flange 72 at one end 74 which supports the housing entry substrate 62 through which the optical fibers 30 first enter the housing 70. An end 76 of the housing 70, opposite the flange 72, supports the primary substrate 12 when mounted thereon. Within the housing 70 is shown a portion of the angular alignment substrate 42 with its plurality of N apertures 44 within a broken away section of the housing 70. In assembling the plurality of N optical fibers 30 by the method described for FIG. 4 or 5, the primary substrate 12 and the angular alignment substrate 42 are located in a supporting means (not shown) outside of the housing 70, and aligned with its end 76 so that the distances B and C shown in FIG. 4 or 5 between the substrates 12, 42, and 62 are maintained. This permits an assembler to move each of the individual optical fibers 30 over and thread it through the associated aperture 14 in the primary substrate 12 and register the optical fiber 30 to its common point 26 in the aperture 14 via the spring-like force. Once all of the optical fibers are threaded through the associated apertures 14 in the primary substrate 12 and permanently bonded thereto with a bonding material 50, the angular alignment substrate 42 is moved up through the end 76 and into the housing 70, and the primary substrate 12 is mounted to the end 76 of the housing 70. The optical fibers can be cleaved, ground, and polished to align with the outer surface 19 of the primary substrate 12 either before or after the primary substrate 12 is mounted at the end 76 of the housing 70.

Figure 7:
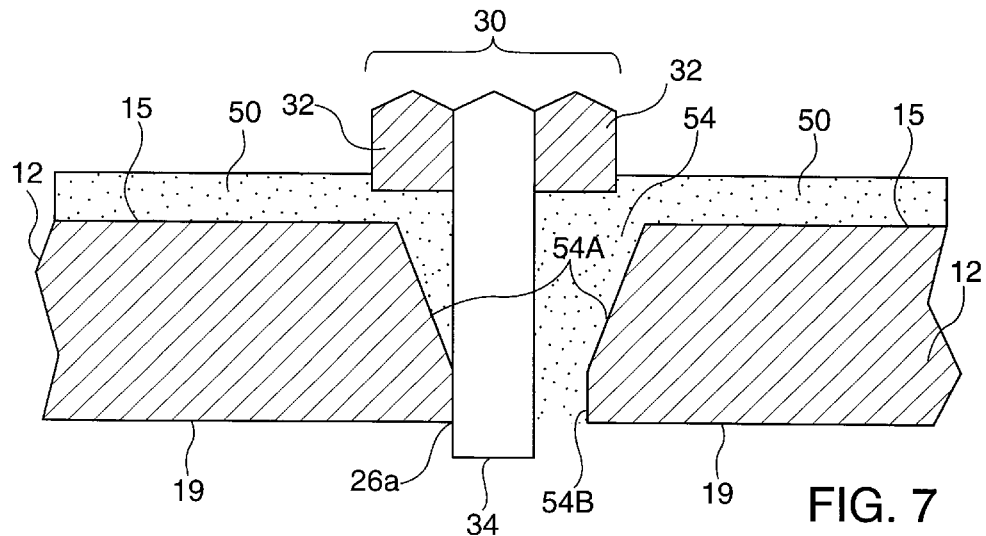
FIG. 7 shows a cross-sectional side view of an alternative aperture that can be formed in the primary substrate of FIG. 1 in accordance with another embodiment of the present invention.

Referring now to FIG. 7, there is shown a cross-sectional side view of an alternative aperture 54 that can be formed in the primary substrate 12 of FIG. 1 in accordance with another embodiment of the present invention. The primary substrate 12 includes a first surface 15 and a second opposing surface 19, and defines a plurality of N apertures 54 (one aperture 54 is shown) therethrough in a defined spaced-apart pattern across the primary substrate 12. Each aperture 54 comprises an inwardly tapered portion 54A which begins at the surface 15 and extends into the primary substrate 12 for most of the distance towards the opposing surface 19 of the primary substrate 12. The remaining portion 54B of the aperture 54 comprises an accurately formed vertical walled portion that completes the aperture 54 from the narrow bottom of the tapered portion 54A through the opposing surface 19 of the primary substrate 12. An exemplary method for forming the plurality of N apertures 54 in the primary substrate 12 is to provide a desired pattern on the surface 15 of the primary substrate 12 and chemically etch, or use any other suitable technique such as machining for forming the inwardly tapered portions 54A until the tapered portion 54A approaches the opposing surface 19 of the primary substrate 12. More accurate aperture portions 54B are formed using laser machining or high resolution pattern transfer techniques such as anisotropic etching for each of the apertures 54 which has a cross-section that is slightly larger than a cladding layer 34 of an optical fiber 30 to be inserted through the associated aperture 54. The cladding layers 34 of each of the plurality of N optical fibers 30 is then inserted through the associated one of the plurality of N apertures 54 in the primary substrate 12 using the technique described hereinabove for FIG. 4 or 5, and registered to the same common point 26a in the vertical walled portion 54B of the aperture 54 as obtained with the other N−1 optical fibers 30. A bonding material 50 can then be spread over the surface 15 of the primary substrate 12 and into each of the apertures 54 to permanently bond the plurality of N optical fibers 30 to the primary substrate 12.

Figure 8:
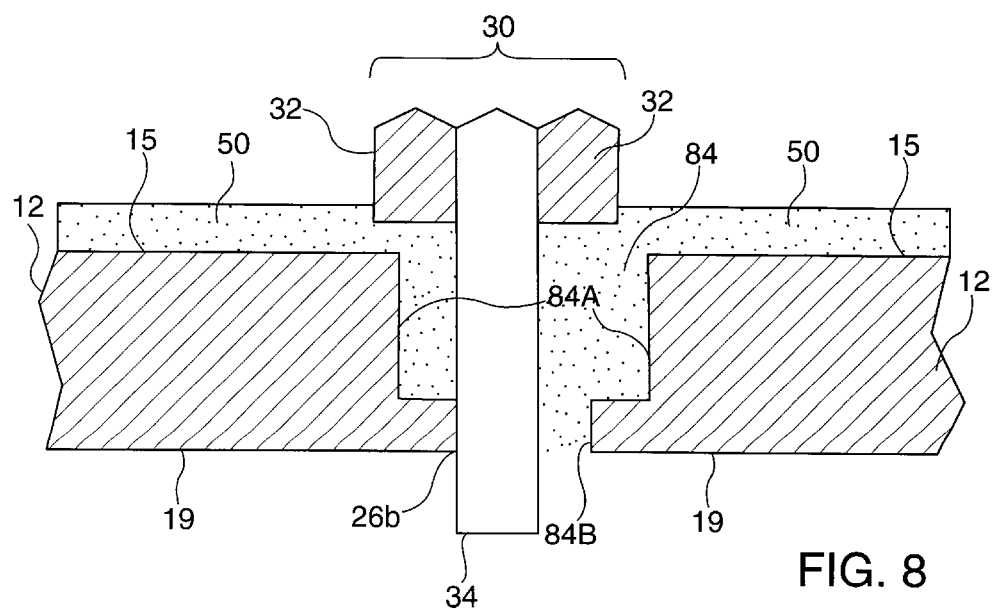
FIG. 8 shows a cross-sectional side view of an alternative aperture that can be formed in the primary substrate of FIG. 1 in accordance with another embodiment of the present invention.

Referring now to FIG. 8, there is shown a cross-sectional side view of an alternative aperture 84 that can be formed in the primary substrate 12 of FIG. 1 in accordance with another embodiment of the present invention. The primary substrate 12 includes a first surface 15 and a second opposing surface 19, and defines a plurality of N apertures 84 (one aperture 84 is shown) therethrough in a defined spaced-apart pattern across the primary substrate 12. Each aperture 84 comprises a first portion 84A with a predetermined cross-section which begins at the surface 15 and extends into the primary substrate 12 for most of the distance towards the opposing surface 19 of the primary substrate 12. The remaining portion of the aperture 84 comprises an accurately formed portion 84B with a predetermined cross-section which is smaller in cross-section than the aperture portion 84A and completes the aperture 84 from the bottom of the larger aperture portion 84A through the opposing surface 19 of the primary substrate 12. The aperture 84 of FIG. 8 can be formed using a similar forming technique as described hereinabove for the alternative aperture 54 of FIG. 7. The cladding layers 34 of each of the plurality of N optical fibers 30 is then inserted through the associated one of the plurality of N apertures 84 in the primary substrate 12 using the technique described hereinabove for FIG. 4 or 5, and registered to the same common point or points 26b in the aperture portion 84B of the aperture 84 as obtained with the other N−1 optical fibers 30. A bonding material 50 can then be spread over the surface 15 of the primary substrate 12 and into each of the apertures 84 to permanently bond the plurality of N optical fibers 30 to the primary substrate 12.

Figure 9:
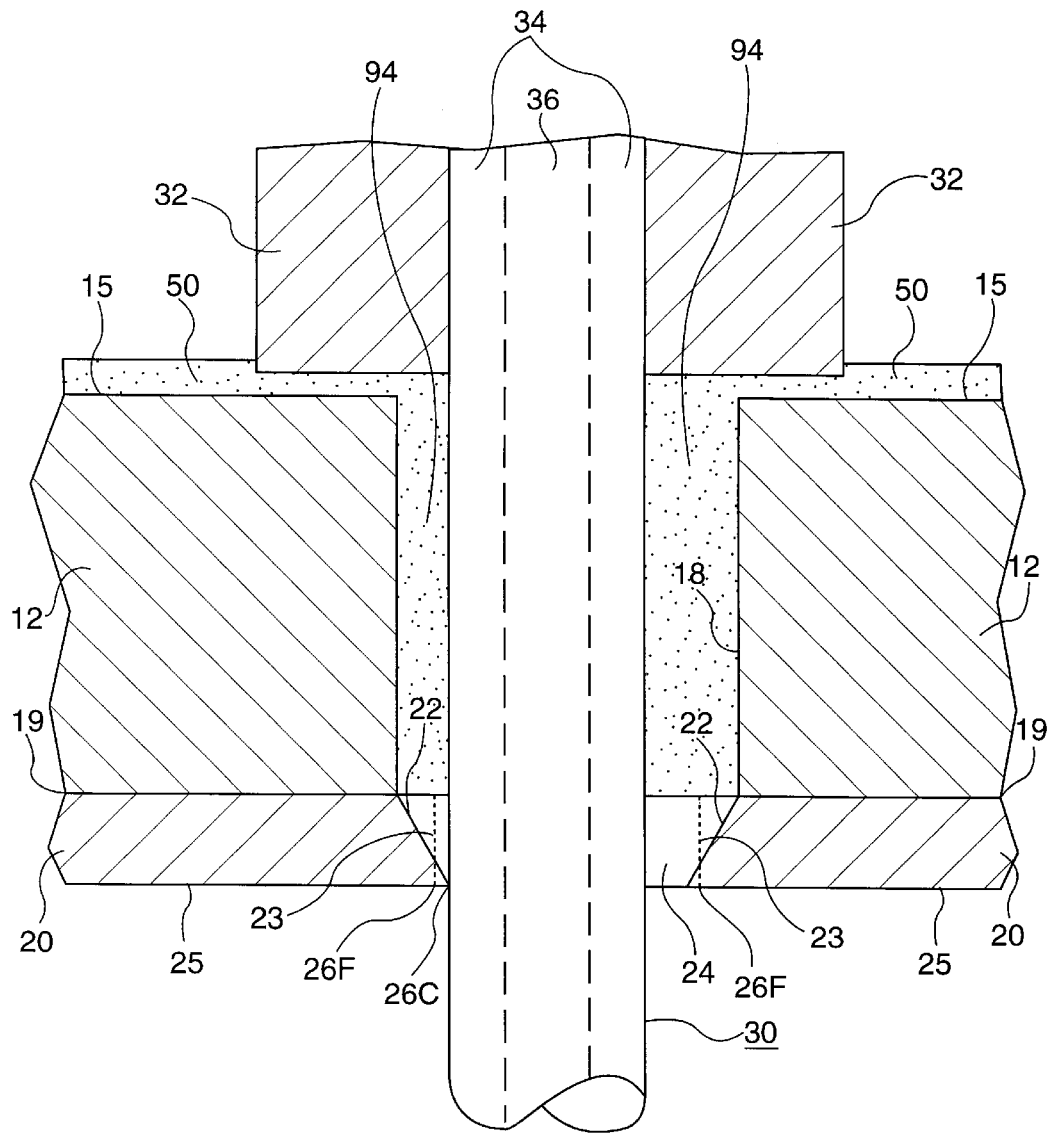
FIG. 9 shows a cross-sectional side view of an optical fiber of FIG. 2 which has been inserted through an aperture of an alternative substrate array arrangement comprising a relatively thick primary substrate and a relatively thin layer in accordance with another embodiment of the present invention.

Referring now to FIG. 9, there is shown a cross-sectional side view of an alternative arrangement for the substrate array 10 of FIG. 1 which comprises an optical fiber 30 of FIG. 2 after it is inserted through an aperture 94 (only one of which is shown) of a relatively thick primary substrate 12 and an aperture 24 of a relatively thin layer 20, and bonded thereto with a bonding material 50 in accordance with another embodiment of the present invention. The arrangement of the relatively thick primary substrate 12 and the relatively thin layer 20 is similar to that disclosed in my U.S. Pat. No. 6,522,817 (U.S. patent application Ser. No. 09/739, 045, filed on Dec. 18, 2000, and issued Feb. 18, 2003) which copended for a period of time with the present application. Each of the plurality of N apertures 94 of the primary substrate 12 is shown as having a cross-sectional shape that extends vertically through the primary substrate 12. Each of the apertures 94 in the primary substrate 12 has a cross-section which is greater than an outside cross-section of a cladding layer 34 of an optical fiber 30 to be inserted therethrough.

The layer 20 can comprise any suitable material such as metal comprising, for example, nickel cobalt (NiCo), stainless steel, carbon steel, or aluminum, and can be formed by known technologies such as hot rolling, etching, machining, or electroforming. The apertures 24 in layer 20 can be formed by etching, machining, mechanical or laser drilling, or in electroforming a foil. The layer 20 is typically in the range of 1 to 6 mils thick. The aperture 24 in layer 20 is shown as matching the cross-section of the associated aperture 94 in the primary substrate 12 at its surface 19 and then having an inwardly tapered wall 22. This is not necessary. Aperture 94 can be larger at surface 19 than aperture 24. The aperture 24 tapers to an accurate dimensioned opening at an exposed surface 25 of the layer 20 having a cross-section which is slightly greater than a cross-section of a cladding layer 34 of the optical fiber 30 to be inserted therethrough. Alternatively, the apertures 24 in the layer 20 can comprise vertical sides 23 (as shown by the dashed lines) instead of the tapered sides 22. The apertures 24 have a cross-section which is slightly greater than a cross-section of a cladding layer 34 of the optical fiber 30 to be inserted therethrough.

The cladding layers 34 of a plurality of N optical fibers 30 are inserted into the associated apertures 94 and 24 of the primary substrate 12 and layer 20 using the technique described hereinbefore for FIG. 4 or 5. The spring-like action obtained with the assembling technique of FIG. 4 or 5 causes each of the optical fibers 30 to be registered against a same point 26C on tapered side 22 of aperture 24 in the layer 20, or a point 26F of vertical side 23 in the layer 20, once all of the N optical fibers 30 have been threaded into the associate apertures 14 and 24. The plurality of N optical fibers can then be bonded to the primary substrate and to the associated apertures 94 and 24 using any suitable bonding material 50 as is shown in FIG. 3.

Figure 10:
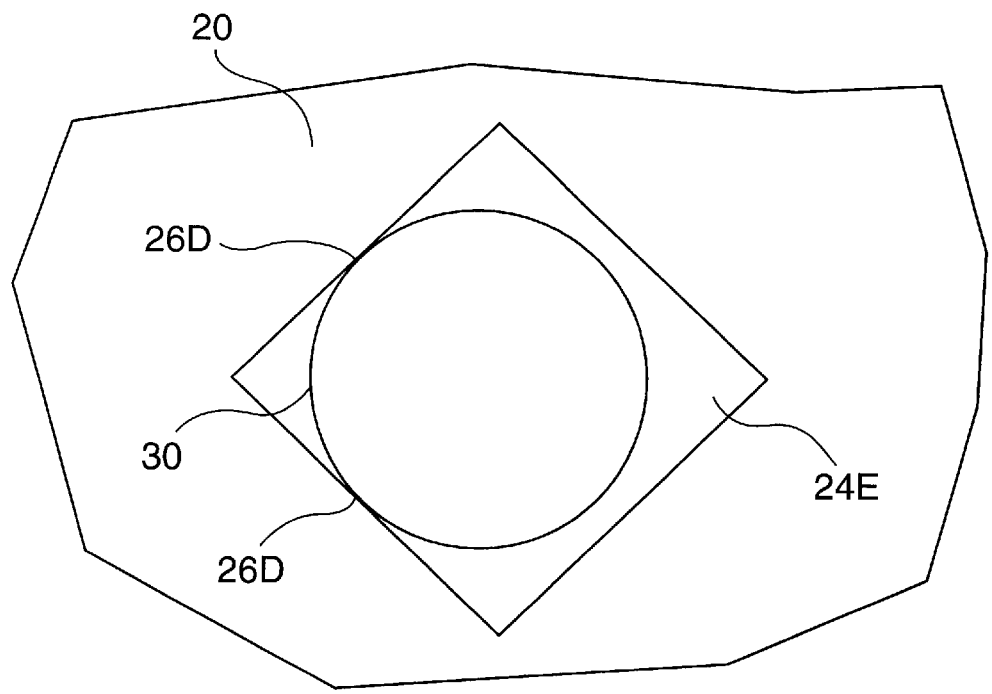
FIG. 10 shows a cross-sectional bottom view of a diamond shaped aperture formed in a layer of the substrate array of FIG. 9 or in a primary substrate of FIGS. 3–8 in accordance with the another embodiment of the present invention.

Referring now to FIG. 10, there is shown a cross-sectional bottom view of a diamond shaped aperture 24E formed in the layer 20 that is mounted on the primary substrate 12 in FIG. 9, and how the cladding layer 34 of the optical fiber 30 is typically registered along two edges of the associated aperture 24E using the assembly technique shown in FIG. 4 or 5 in accordance with the present invention. It is to be understood that although the following discussion is directed to apertures 24 in the layer 20 of FIG. 9, the diamond shaped aperture 24E, or any other suitable cylindrical or non-cylindrical aperture can also be substituted for apertures 14 as may be used in the primary substrate 12 of FIGS. 1 and 3–8. The aperture 24E may include inwardly tapered sides 22F towards a lower surface of the layer 20 as is shown in FIG. 9. The optical fiber 30 is positioned against bottom edges of the diamond shaped aperture 24E at the two points 26D by the spring-like action of the optical fiber 30 when inserted therethrough using the technique of FIG. 4 or 5. In accordance with a preferred embodiment of the present invention, each aperture 24 in the layer 20 of FIG. 9 can comprise any suitable shape that is slightly larger at its narrowest point than the outer cross-section of a cladding layer 34 of an optical fiber 30 to be inserted therethrough, and permits the optical fiber 30 to be registered against at least one edge of a sidewall of the associated aperture 24 of primary substrate 12 to within a preselected alignment tolerance value for the array. Using the assembly technique of FIG. 4 or 5, once an optical fiber 30 is threaded in the apertures 14 and 24 of the primary substrate 12 and layer 20 of FIG. 9, the spring-like force in the cladding layer 34 of the optical fiber 30 simultaneously forces the cladding layer 34 to contact two points 26D in the sidewalls defining the aperture 24 of the layer 20.

Figure 11:
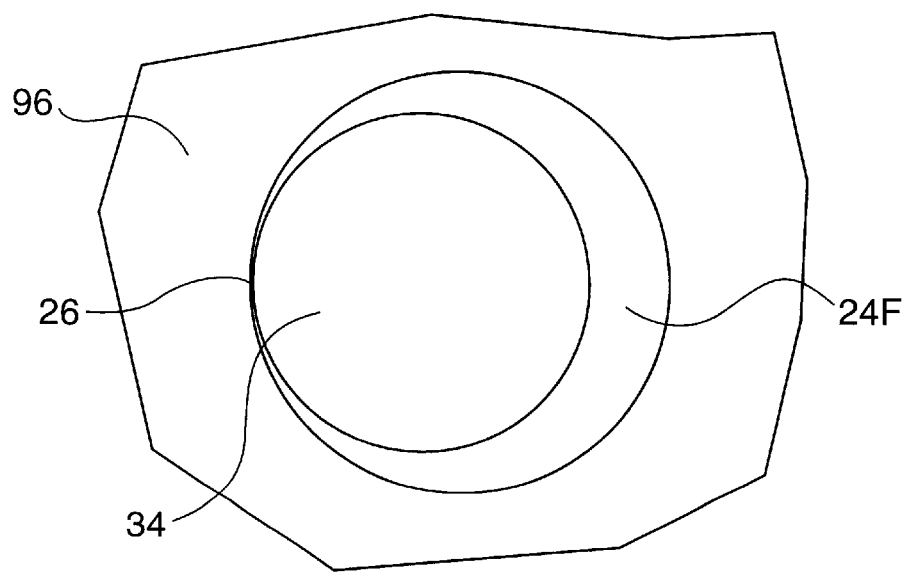
FIG. 11 shows a cross-sectional bottom view of a circular shaped aperture formed in the layer of the substrate array of FIG. 9 or in a primary substrate of FIGS. 3–8 in accordance with the present invention.

Referring now to FIG. 11, there is shown a cross-sectional bottom view of a circular shaped aperture 24F formed in a layer of material 96, and how the cladding layer 34 of the optical fiber 30 is typically registered along an edge 26 of the associated aperture 24F using the assembly technique shown in FIG. 4 or 5 in accordance with the present invention. The aperture 24F in the layer 96 can be representative of either one of the aperture 24 in the layer 20 where the optical fiber 30 is registered at the surface 25 of the layer 20 of FIG. 9, or the optical fiber 30 is registered to the aperture 14 in the primary substrate 12 in any one of FIGS. 1 and 3–8. The optical fiber 30 is positioned against an edge 26 of the circular aperture 24F by the spring-like action of the optical fiber 30 when inserted therethrough using the technique of FIG. 4 or 5.

It is to be appreciated and understood that the specific embodiments of the present invention described hereinabove are merely illustrative of the general principles of the present invention. Various modifications may be made by those skilled in the art which are consistent with the principles set forth. For example, the apertures 14 in the primary substrate 12 and 24 in the layer 20 can have any suitable circular or non-circular shape that allows an optical fiber or other suitable type of element to be moved into contact with at least one point on the side surface of the apertures 14 or 24 depending on the shape of the aperture 14 or 24. Still further, using the technique of FIG. 4 or 5 for registering elements in the apertures 14 of the substrate array 10 can comprise a substrate array 10 which has either a single or multiple layers that provide precision alignment via at least one registration point for elements such as optical fibers 30 or other suitable elements in an array. Still further, the entry aperture 54A of FIG. 7 or the entry aperture 84A of FIG. 8 in the primary substrate 12 can comprise any suitable circular or non-circular shape that allows an optical fiber 30 or other suitable element to be passed through it. Still further, the exit aperture 54B of FIG. 7 or the exit aperture 84B of FIG. 8 in the primary substrate 12 can be comprised of other than vertical sidewalls provided the opening of the aperture at surface 19 is within the predetermined tolerance level. Still further, the optical fibers 30 can be directed sideways at an angle after passing through aperture 14 of primary substrate 12 of FIG. 1 by using a second substrate below the primary substrate 12. Furthermore, each optical fiber 30 can be inserted through one of the apertures 14 of primary substrate 12 and then the primary substrate 12 can be turned 90 degrees from the position shown in FIG. 1 such that gravity causes the optical fibers to all rest against the same point and/or sidewall of its associated aperture. The optical fibers are then typically attached to the primary substrate by an adhesive to permanently hold them in place such that they are aligned (registered) to a desired center-to-center tolerance value.

What is claimed is:
1. Array apparatus comprising:
   a primary substrate having sufficient structure to support an array of N spaced-apart elements and defining a plurality of N apertures which each extend therethrough from a first surface to a second opposing surface of the primary substrate with a cross-section of each of the N apertures being greater than a cross-section of an optical fiber and having a center that is aligned to a preselected tolerance value which is required for the array of elements;
   a smallest cross-section of each of the apertures being such that when the plurality of elements are inserted through their primary substrate apertures, which apertures have limited cross-section variations, so as to facilitate spacings between adjacent elements that are within the preselected tolerance value; and
   a plurality of N elements, each of the elements passes through one of the N apertures in the primary substrate and rests against the same one of a group consisting of a predetermined point and a predetermined side of its associated aperture such that the plurality of N elements are aligned within the preselected tolerance value.
2. The array apparatus of claim 1 wherein the elements are optical fibers.
3. Optical fiber array apparatus comprising:
   a primary substrate having sufficient structure to support an array of N spaced-apart optical fibers and defining a plurality of N apertures which each extend therethrough from a first surface to a second opposing surface of the primary substrate with a cross-section of each of the N apertures being greater than a cross-section of an optical fiber and having a center that is aligned to a preselected tolerance value which is required for the array of optical fibers;
   a smallest cross-section of each of the apertures being such that when the plurality of optical fibers are inserted through their primary substrate apertures, which have limited cross-section variations, so as to facilitate spacings between adjacent optical fibers that are within the preselected tolerance value; and
   a plurality of N optical fibers, each optical fiber comprising a cladding layer surrounding an optical core, and when each optical fiber is inserted through its associated aperture in the primary substrate it is registered by a spring-like force in the optical fiber against one of a group consisting of a predetermined point and a predetermined side of its associated aperture which is the same for each of the plurality of N optical fibers and their associated apertures such that the plurality of N optical fibers are aligned within the preselected tolerance value.
4. The optical fiber array apparatus of claim 3 wherein each of the apertures in the primary substrate comprises a cross-sectional shape which at its narrowest point is greater than the cross-section of a cladding layer of the optical fiber to be inserted therethrough.
5. The optical fiber array apparatus of claim 3 wherein each of the apertures in the primary substrate comprises vertical side walls that extend through the primary substrate from the first surface to the second opposing surface.
6. The optical fiber array apparatus of claim 3 wherein each of the apertures in the primary substrate comprises:
   a first aperture section comprising side walls that extend partially through the primary substrate from the first surface with a cross-sectional shape that is greater than the cladding layer surrounding an optical core of an optical fiber to be inserted therethrough; and
   a second aperture section comprising side walls and having a cross-sectional shape which is less than the cross-sectional shape of the aperture in the first aperture section and greater than the cross-section of the cladding layer of an optical fiber, the aperture in the second section having a same axis as the aperture in the first aperture section and extending the remaining distance through the primary substrate from a base of the aperture in the first section through the second opposing surface of the primary substrate.
7. The optical fiber array apparatus of claim 3 wherein each of the apertures in the primary substrate comprises:
   a first aperture section comprising inwardly tapered side walls that extend partially through the primary substrate from the first surface with the narrowest cross-section thereof being greater than the cladding layer surrounding an optical core of an optical fiber to be inserted therethrough; and
   a second aperture section comprising vertical side walls and having a cross-section which is equal to or less than the narrowest cross-section of the tapered aperture in the first aperture section and greater than the cross-section of the cladding layer of an optical fiber, the aperture in the second section having a same axis as the first aperture section and extending the remaining distance through the primary substrate from a base of the aperture in the first section through the second opposing surface of the primary substrate.
8. The optical fiber array apparatus of claim 3 wherein each of the apertures in the primary substrate comprises at least one of a group consisting a circular and a non-circular portion thereof such that the plurality of N optical fibers are aligned within the preselected tolerance value when registered against at least one of a group consisting of a predetermined point and a predetermined side of the associated aperture in the primary substrate which is the same for each of the plurality of N optical fibers and their associated apertures.

9. The optical fiber array apparatus of claim 3 further comprising bonding material which fixes the positions of the N optical fibers to the primary substrate once the optical fibers are registered in their associated apertures.

10. The optical fiber array apparatus of claim 3 further comprising a relatively thin first layer, which has insufficient structure by itself to support an array of N spaced-apart optical fibers, engaging the second surface of the primary substrate and defines a plurality of N spaced apart apertures therethrough with centers of the first layer apertures being aligned to a preselected tolerance value which is that required for the array of optical fibers, a smallest cross-section of each of the first layer apertures being less than a smallest cross-section of each primary substrate aperture;

each first layer aperture being within a footprint of one of the primary substrate apertures such that optical fibers inserted through the primary substrate apertures enter the first layer apertures; and the cross-sections of the first layer apertures having limited variations that facilitate spacings between adjacent optical fibers placed in the primary substrate apertures and entering the first layer apertures which are within the preselected tolerance value such that the plurality of N optical fibers are aligned and registered against at least one of a group consisting of a predetermined point and a predetermined side of the associated aperture in the first layer which is the same for each of the plurality of N optical fibers and their associated apertures.

11. The optical fiber array apparatus of claim 3 further comprising a directing arrangement for directing each of the plurality of N optical fibers at a predetermined angle towards the primary substrate so that each optical fiber is curved with a spring-like action after threading into the associated aperture in the primary substrate such that the optical fiber is registered against one of a group consisting of at least one of a predetermined point and a predetermined side of the associated aperture in the primary substrate.

12. The optical fiber array apparatus of claim 11 wherein the directing arrangement comprises:

a housing entry substrate defining a plurality of N apertures extending through a first surface and a second opposing surface of the housing entry substrate and having a pattern which corresponds to a pattern of the apertures in the primary substrate, each housing entry substrate aperture having a cross-section which is larger than that of a jacket covering the cladding layer of an optical fiber to be inserted therethrough at a predetermined angle; and an angular alignment substrate which is spaced apart by a first predetermined distance from the directing arrangement on one side thereof and by a second predetermined distance from the primary substrate on the other side thereof, the angular alignment substrate defining a plurality of N apertures extending through a first surface and a second opposing surface thereof and having a pattern which corresponds to a pattern of the plurality of N apertures in the primary substrate, each angular alignment substrate aperture having a cross-section which is larger than that of a jacket covering the cladding layer of an optical fiber to be inserted therethrough, and each optical fiber that is threaded through its associated aperture in the angular alignment substrate from the housing entry substrate at a predetermined angular relationship thereto is caused to be curved with a spring-like action towards the primary substrate and registered in the associated aperture in the primary substrate when the optical fiber is threaded therethrough.

13. The optical fiber array apparatus of claim 12 wherein the angular threading of the optical fibers through the apertures in the angular alignment substrate from the corresponding apertures in the housing entry substrate and a distance between the two substrates determines an amount of force produced in the spring-like action of each optical fiber.

14. The optical fiber array apparatus of claim 11 wherein each of the apertures in the primary substrate comprises vertical side walls that extend through the primary substrate from the first surface to the second opposing surface.

15. The optical fiber array apparatus of claim 11 wherein each of the apertures in the primary substrate comprises:

a first aperture section comprising side walls that extend partially through the primary substrate from the first surface with a cross-section that is greater than the cladding layer surrounding an optical core of an optical fiber to be inserted therethrough; and a second aperture section comprising side walls and having a cross-section which is less than the cross-section of the aperture in the first aperture section and greater than the cross-section of the cladding layer of an optical fiber, the aperture in the second section having a same axis as the aperture in the first aperture section and extending the remaining distance through the primary substrate from the base of the aperture in the first section to the second opposing surface of the primary substrate.

16. The optical fiber array apparatus of claim 11 wherein each of the apertures in the primary substrate comprises:

a first aperture section comprising inwardly tapered side walls that extend partially through the primary substrate from the first surface with the narrowest cross-section thereof being greater than the cladding layer surrounding an optical core of an optical fiber to be inserted therethrough; and a second aperture section comprising side walls having a cross-section which is equal to or less than the narrowest cross-section of the tapered aperture in the first aperture section and greater than the cross-section of the cladding layer of an optical fiber, the aperture in the second section having a same axis as the aperture in the first aperture section and extending the remaining distance through the primary substrate from the base of the aperture in the first section to the second opposing surface of the primary substrate.

17. The optical fiber array apparatus of claim 11 wherein each of the apertures in the primary substrate comprises a portion thereof with a cross-section from one of a group consisting of a circular shape and a non-circular shape such that the plurality of N optical fibers are aligned within the preselected tolerance value when registered against at least one of a group consisting of a predetermined point and a predetermined side of the associated aperture in the primary substrate which is the same for each of the plurality of N optical fibers and their associated apertures.

18. The optical fiber array apparatus of claim 11 further comprising bonding material which fixes the positions of the N optical fibers to the primary substrate once the optical fibers are registered in their associated apertures.

19. Apparatus for registering a plurality of optical fibers in an optical fiber array comprising:

a primary substrate having sufficient structure to support an array of N spaced-apart optical fibers and defining a plurality of N apertures in a predetermined pattern which each extend therethrough from a first surface to a second opposing surface of the primary substrate where each of the N apertures comprises a cross-section which is greater than a cross-section of an optical fiber, the apertures having centers that are aligned to a preselected tolerance value which is required for the array of optical fibers;

a smallest cross-section of each of the apertures being such that optical fibers inserted through the primary substrate apertures, which have limited cross-section variations, so as to facilitate spacings between adjacent optical fibers placed in the apertures being within the preselected tolerance value; and a directing arrangement for directing each of the plurality of N optical fibers at a predetermined angle towards the primary substrate so that each optical fiber is curved with a spring-like action after threading into the associated aperture in the primary substrate such that the optical fiber is registered against one of a group consisting of at least one of a predetermined point and a predetermined side of the associated aperture in the primary substrate.

20. The optical fiber array apparatus of claim 19 wherein the directing arrangement comprises:

a housing entry substrate defining a plurality of N apertures extending through a first surface and a second opposing surface of the housing entry substrate and having a pattern which corresponds to a pattern of the apertures in the primary substrate, each housing entry substrate aperture having a cross-section which is larger than that of a jacket covering the cladding layer of an optical fiber to be inserted therethrough at a predetermined angle; and an angular alignment substrate which is spaced apart by a first predetermined distance from the directing arrangement on one side thereof and by a second predetermined distance from the primary substrate on the other side thereof, the angular alignment substrate defining a plurality of N apertures extending through a first surface and a second opposing surface thereof and having a pattern which corresponds to a pattern of the plurality of N apertures in the primary substrate, each angular alignment substrate aperture having a cross-section which is larger than that of a jacket covering the cladding layer of an optical fiber to be inserted therethrough, and each optical fiber that is threaded through its associated aperture in the angular alignment substrate from the housing entry substrate at a predetermined angular relationship thereto is caused to be curved with a spring-like action towards the primary substrate and registered in the associated aperture in the primary substrate when the optical fiber is threaded therethrough.

21. The optical fiber array apparatus of claim 20 wherein the insertion of the optical fiber at a predetermined angle through the aperture of the housing entry substrate and then through the aperture in the angular alignment substrate and a distance between the two substrates determines an amount of force produced in the spring-like action of each optical fiber at the primary substrate aperture.

22. The optical fiber array apparatus of claim 19 wherein each of the apertures in the primary substrate comprises a cross-sectional shape which at its narrowest point is greater than the cross-section of a cladding layer of an optical fiber to be inserted therethrough.

23. The optical fiber array apparatus of claim 19 wherein each of the apertures in the primary substrate comprises vertical side walls that extend through the primary substrate from the first surface to the second opposing surface.

24. The optical fiber array apparatus of claim 19 wherein each of the apertures in the primary substrate comprises:

a first aperture section comprising a cross-section that extends partially through the primary substrate from the first surface that is greater than the cladding layer surrounding an optical core of an optical fiber to be inserted therethrough; and a second aperture section comprising a cross-section which is less than the cross-section of the aperture in the first aperture section and greater than the cross-section of the cladding layer of an optical fiber, the aperture in the second section having the same axis as the aperture in the first aperture section and extending the remaining distance through the primary substrate from the base of the aperture in the first section to the second opposing surface of the primary substrate.

25. The optical fiber array apparatus of claim 19 wherein each of the apertures in the primary substrate comprises:

a first aperture section comprising inwardly tapered side walls that extend partially through the primary substrate from the first surface with the narrowest cross-section thereof being greater than the cladding layer surrounding an optical core of an optical fiber to be inserted therethrough; and a second aperture section comprising vertical side walls and having a cross-section which is equal to or less than the narrowest cross-section of the tapered aperture in the first aperture section and greater than the cross-section of the cladding layer of an optical fiber, the aperture in the second section having a same axis as the aperture in the first aperture section and extending the remaining distance through the primary substrate from the base of the aperture in the first section to the second opposing surface of the primary substrate.

26. The optical fiber array apparatus of claim 19 wherein each of the apertures in the primary substrate comprises a portion thereof with a cross-section from one of a group consisting of a circular shape and a non-circular shape such that the plurality of N optical fibers are aligned within the preselected tolerance value when registered against at least one corresponding side of their associated apertures.

27. The optical fiber array apparatus of claim 19 further comprising bonding material which fixes the positions of the N optical fibers to the primary substrate once the optical fibers are registered in their associated apertures.

28. The optical fiber array apparatus of claim 19 further comprising a relatively thin first layer, which has insufficient structure by itself to support an array of N spaced-apart optical fibers, engaging the second surface of the primary substrate and defining N apertures therethrough with centers of the first layer apertures being aligned to a preselected tolerance value which is that required for the array of optical fibers, the smallest cross-section of each of the first layer apertures being less than the smallest cross-section of each of the primary substrate apertures;

each first layer aperture being within a footprint of one of the primary substrate apertures such that optical fibers inserted through the primary substrate apertures enter the first layer apertures; and the cross-sections of the first layer apertures having limited variations that facilitate spacings between adjacent optical fibers placed in the primary substrate apertures and entering the first layer apertures being within the preselected tolerance value such that the plurality of N optical fibers are aligned and registered against only one of a group consisting of at least one predetermined point and at least one predetermined side of its associated aperture in the first layer which is the same for each of the plurality of N optical fibers and their associated apertures and is within the preselected tolerance value.

29. Array apparatus comprising:

a primary substrate having sufficient structure to support an array of N spaced-apart elements and defining a plurality of N apertures which each extend therethrough from a first surface to a second opposing surface of the primary substrate with a cross-section of each of the N apertures being greater than a cross-section of an element and having a center that is aligned to a preselected tolerance value which is required for the array of elements;

a smallest cross-section of each of the apertures being such that when the plurality of elements are inserted through their primary substrate apertures, which have limited cross-section variations, so as to facilitate spacings between adjacent elements that are within the preselected tolerance value; and a plurality of N elements, and when each element is inserted through its associated aperture in the primary substrate it is registered, by a spring-like force in the element, against one of a group consisting of a predetermined point and a predetermined side of its associated aperture which is the same for each of the plurality of N elements and their associated apertures such that the plurality of N elements are aligned within the preselected tolerance value.

30. The array apparatus of claim 29 further comprising a directing arrangement for directing each of the plurality of N elements at a predetermined angle towards the primary substrate so that when each element is curved with a spring-like action into a predetermined direction to the first surface of the primary substrate and threaded into the associated aperture in the primary substrate, the element is registered in the associated aperture in the primary substrate.

31. The optical fiber array apparatus of claim 30 wherein the directing arrangement comprises:

a housing entry substrate defining a plurality of N apertures extending through a first surface and a second opposing surface of the housing entry substrate and having a pattern which corresponds to a pattern of the apertures in the primary substrate, each housing entry substrate aperture having a cross-section which is larger than that of an element to be inserted therethrough at a predetermined angle; and an angular alignment substrate which is spaced apart by a first predetermined distance from the directing arrangement on one side thereof and by a second predetermined distance from the primary substrate on the other side thereof, the angular alignment substrate defining a plurality of N apertures extending through a first surface and a second opposing surface thereof and having a pattern which corresponds to a pattern of the plurality of N apertures in the primary substrate, each angular alignment substrate aperture having a cross-section which is larger than an element to be inserted therethrough, and each element that is threaded through its associated aperture in the angular alignment substrate from the housing entry substrate at a predetermined angular relationship thereto is caused to be curved with a spring-like action towards the primary substrate and registered in the associated aperture in the primary substrate when the optical fiber is threaded therethrough.

32. Array apparatus comprising:

a relatively thick primary substrate having sufficient structure to support an array of N spaced-apart elements and having first and second opposing surfaces and defining a plurality of N primary substrate apertures which each extend therethrough from the first surface to the second surface with a cross-section of each of the N substrate apertures being greater than a cross-section of an element such that one element can be passed through in each of the N primary substrate apertures;

a relatively thin first layer, which has insufficient structure by itself to support an array of N spaced-apart elements, engaging the second surface of the primary substrate and defining N apertures therethrough with centers thereof being aligned to a preselected tolerance value which is that required for the array of elements, the smallest cross-section of each of the first layer apertures being less than the smallest cross-section of each of the primary substrate apertures and greater than the cross-section of an element to be placed therein, each first layer aperture being within a footprint of one of the primary substrate apertures; and a plurality of N elements, and when each element is inserted through its associated aperture in each of the primary substrate and the relatively thin first layer it is registered against one of a group consisting of a predetermined point and a predetermined side of its associated aperture which is the same for each of the plurality of N elements and their associated apertures such that the plurality of N elements are aligned within the preselected tolerance value.

33. The array apparatus of claim 32 further comprising a directing arrangement for directing each of the plurality of N elements at a predetermined angle towards the primary substrate so that when each element is curved with a spring-like action into a predetermined angular direction to the first surface of the primary substrate and threaded into the associated aperture in the primary substrate, the element is registered in the associated aperture in the primary substrate.

34. The array apparatus of claim 33 wherein the directing arrangement comprises:

a housing entry substrate defining a plurality of N apertures extending through a first surface and a second opposing surface of the housing entry substrate and having a pattern which corresponds to a pattern of the apertures in the primary substrate, each housing entry substrate aperture having a cross-section which is larger than an element to be inserted therethrough; and an angular alignment substrate which is spaced apart by a first predetermined distance from the housing entry substrate on one side thereof and by a second predetermined distance from the primary substrate on the other side thereof, the angular alignment substrate defining a plurality of N apertures extending through a first surface and a second opposing surface thereof and having a pattern which corresponds to a pattern of the plurality of N apertures in the primary substrate, each angular alignment substrate aperture having a cross-section which is larger than an element to be inserted therethrough, and each element that is threaded through its associated aperture in the housing entry substrate at a predetermined angular relationship thereto and then the angular alignment substrate is caused to be curved with a spring-like action towards the primary substrate and registered in the associated aperture in the primary substrate when the element is threaded therethrough.

35. A method of registering a plurality of N elements to a preselected value in an array comprising the steps of:

forming a primary substrate having sufficient structure to support an array of N spaced-apart elements and defining a plurality of N apertures in a predetermined pattern across the primary substrate, wherein each aperture extends therethrough from a first surface to a second opposing surface of the primary substrate, has a cross-section at its narrowest point which is greater than a cross-section of an element, and has a center which is aligned to a preselected tolerance value for the apertures which is required for the array of elements, the smallest cross-section of each of the apertures being such that elements inserted through the primary substrate apertures have predetermined limited side movement variations; and inserting each of the plurality of N elements through one of the N apertures in the primary substrate and applying a spring-like force to each of the elements such that each of the N elements rests against at least one of a group consisting of a predetermined point and a predetermined side of its associated aperture such that the plurality of N elements are aligned within the preselected tolerance value.

36. The method of claim 35 wherein the elements are optical fibers.

37. A method of registering a plurality of N optical fibers to a preselected value in an optical fiber array comprising the steps of:

(a) forming a primary substrate having sufficient structure to support an array of N spaced-apart optical fibers and defining a plurality of N apertures in a predetermined pattern across the primary substrate, wherein each aperture extends therethrough from a first surface to a second opposing surface of the primary substrate, has a cross-section at its narrowest point which is greater than a cross-section of a cladding layer of an optical fiber, and has a center which is aligned to a preselected tolerance value for the apertures which is required for the array of optical fibers, the smallest cross-section of each of the apertures being such that optical fibers inserted through the primary substrate apertures have predetermined limited side movement variations;

(b) directing each of the plurality of N optical fiber at a predetermined angle towards the primary substrate from a directing arrangement; and (c) causing each optical fiber to be curved with a spring-like action into a predetermined angular direction to the first surface of the primary substrate for threading through the associated aperture in the primary substrate, and be registered against one of a group consisting of a predetermined point and a predetermined side of its associated aperture by the spring-like action when the optical fiber is threaded through the associated aperture in the primary substrate.

38. The method of claim 37 wherein in performing step (b), performing the substeps of:

(b1) threading the plurality of N optical fibers through separate ones of a plurality of N apertures in a housing entry substrate at a predetermined angle, the plurality of N apertures in the housing entry substrate having a pattern which corresponds to the predetermined pattern of the primary substrate: and (b2) threading the optical fibers at the predetermined angle through separate corresponding ones of a plurality of N apertures in an angular alignment substrate for producing a predetermined force in the spring-like action of each optical fiber that is threaded through the associated apertures in the primary substrate in step (c) for registering the optical fiber.

39. The method of claim 37 further comprising the step of (d) forming a relatively thin first layer, which has insufficient structure by itself to support an array of N spaced-apart optical fibers, on the second surface of the primary substrate which defines a plurality of N apertures therethrough with centers of the first layer apertures being aligned to a preselected tolerance value which is that required for the array of optical fibers, a smallest cross-section of each of the first layer apertures being less than the smallest cross-section of each of the primary substrate apertures, each first layer aperture being within a footprint of one of the primary substrate apertures such that optical fibers inserted through the primary substrate apertures enter the first layer apertures, and the cross-sections of the first layer apertures having limited variations that facilitate spacings between adjacent optical fibers placed in the primary substrate apertures and entering the first layer apertures being within the preselected tolerance value such that the plurality of N optical fibers are aligned and registered against only one of a group consisting of at least one predetermined point and at least one predetermined side of its associated aperture in the first layer which is the same for each of the plurality of N optical fibers and their associated apertures.

40. A method of forming an array apparatus, which supports N spaced-apart elements to a preselected tolerance value, the method comprising the steps of:

(a) forming a primary substrate having sufficient structure to support an array of N spaced-apart elements and defining a plurality of N apertures in a predetermined pattern across the primary substrate, wherein each aperture extends therethrough from a first surface to a second opposing surface of the primary substrate, has a cross-section at its narrowest point which is greater than a cross-section of an element, and has a center which is aligned to a preselected tolerance value for the apertures which is required for the array of elements, the smallest cross-section of each of the apertures being such that elements inserted through the primary substrate apertures have predetermined limited side movement variations;

(b) directing each of the plurality of N elements at a predetermined angle towards the primary substrate from a directing arrangement; and (c) causing each element to be curved with a spring-like action into a predetermined angular direction to the first surface of the primary substrate for threading through the associated aperture in the primary substrate, and be registered against one of a group consisting of a predetermined point and a predetermined side of its associated aperture by the spring-like action when the element is threaded through the associated aperture in the primary substrate.

41. The method of claim 40 comprising the further step of:
(d) applying a bonding material to the plurality of N elements in their associated apertures in the primary substrate so as to attach the N elements to the primary substrate with the elements being aligned to the preselected tolerance value.

42. The method of claim 40 wherein in performing step (b), performing the substeps of:
(b1) threading the plurality of N elements through separate ones of a plurality of N apertures in a housing entry substrate at a predetermined angle, the plurality of N apertures in the housing entry substrate having a pattern which corresponds to the predetermined pattern of the primary substrate: and
(b2) threading the elements at the predetermined angle through separate corresponding ones of a plurality of N apertures in an angular alignment substrate for producing a predetermined force in the spring-like action of each element that is threaded through the associated apertures in the primary substrate in step
(c) for registering the element.

43. The method of claim 40 further comprising the step of:
(d) forming a relatively thin first layer, which has insufficient structure by itself to support an array of N spaced-apart elements, on the second surface of the primary substrate which defines a plurality of N apertures therethrough with centers of the first layer apertures being aligned to a preselected tolerance value which is that required for the array of elements, a smallest cross-section of each of the first layer apertures being less than the smallest cross-section of each of the primary substrate apertures;

each first layer aperture being within a footprint of one of the primary substrate apertures such that elements inserted through the primary substrate apertures enter the first layer apertures; and the cross-sections of the first layer apertures having limited variations that facilitate spacings between adjacent elements placed in the primary substrate apertures and entering the first layer apertures being within the preselected tolerance value such that the plurality of N elements are aligned and registered against only one of a group consisting of at least one predetermined point and at least one predetermined side of its associated aperture in the first layer which is the same for each of the plurality of N elements and their associated apertures.

* * * * *